United States Patent
Greider

[15] 3,694,853
[45] Oct. 3, 1972

[54] APPARATUS FOR ENCASING A PRODUCT

[72] Inventor: Charles Austin Greider, Des Moines, Iowa

[73] Assignee: Townsend Engineering Company, Des Moines, Iowa

[22] Filed: Nov. 9, 1970

[21] Appl. No.: 87,818

[52] U.S. Cl. ................................................17/33
[51] Int. Cl. ...........................................A22c 11/10
[58] Field of Search ................................17/33, 34

[56] References Cited

UNITED STATES PATENTS

| 1,292,645 | 1/1919 | Reisfeld | 17/33 |
| 1,363,505 | 12/1920 | Grabowski | 17/33 |
| 1,366,183 | 1/1921 | Hottmann | 17/33 |
| 1,759,587 | 5/1930 | Parker | 17/33 |
| 3,191,222 | 6/1965 | Townsend | 17/33 |

*Primary Examiner*—Lucie H. Laudenslager
*Attorney*—Zarley, McKee & Thomte

[57] ABSTRACT

An apparatus for encasing a product includes a product encasing machine, a linking apparatus, and a looping apparatus. The product encasing machine includes a rotatable stuffing tube which carries a chuck and a pair of lands adjacent its discharge end. The chuck and lands are mounted so as to rotate in unison with the stuffing tube. The chuck and lands are separable and are adapted to be moved selectively away from the longitudinal axis of the stuffing tube. The linking apparatus includes a pair of loop members carrying pinching members thereon. The pinching members include pinching surfaces adapted to engage and collapse the rotating casing issuing from the encasing machine. The pinching surfaces each include at least one portion in vertical alignment below the longitudinal centerline of the loop on which it is carried so that it will travel at a uniform velocity as it is carried by the loop members. The looping apparatus includes a guide through which the linked casings are fed. The guide is adapted to swing the links in a loop. The looping apparatus also includes a plurality of hooks adapted to catch and carry away the linked casing as it is swung by the guide.

18 Claims, 12 Drawing Figures

INVENTOR
CHARLES AUSTIN GREIDER
BY Zarley, McKee & Thomte
ATTORNEYS

Fig. 10

APPARATUS FOR ENCASING A PRODUCT

This invention relates to a machine for encasing a product to provide sausage or franks and the like and more particularly to a machine capable of encasing a product within casings made of delicate materials such as natural animal intestines or delicate artificial materials.

Presently known product encasing devices include a stuffing tube, a pump for pumping plastic product through the stuffing tube, a rotary chuck in front of the discharged end of the stuffing tube, linking apparatus for linking the filled casing, and looping apparatus for arranging the links in loops. Prior to the encasing operation, a folded casing is mounted over the stuffing tube. The folded casing is compressed in an accordion-like fashion, and includes one unfolded end protruding beyond the discharge end of the stuffing tube. As the product issues from the discharge end of the stuffing tube it fills the portion of the casing protruding therebeyond, thereby filling the casing and propelling it away from the discharge end so that additional portions of the casing will be unfolded and moved in front of the discharge end of the stuffing tube. Presently known devices utilize a nonrotatable stuffing tube and include a chuck surrounding the filled casings and rotating so as to impart rotation thereto. The rotating chuck causes the filled casing to rotate with respect to the yet unfilled folded casing on the stuffing tube. While this arrangement is satisfactory for casing made of strong material such as cellulose, it is not satisfactory for more delicate materials such as natural casings made of animal intestines or some artificial dissolvable casings which are easily torn. The rotation of the chuck cases a torsional force to be exerted between the rotating filled casing and the stationary casing on the stuffing tube, and often results in tearing of the casing at a point between the stuffing tube and the chuck.

Presently known linking devices are positioned in front of the discharge end of the stuffing tube in a position wherein they can engage the filled casing and pinch it at various points along its lengths so as to create a plurality of links. This pinching action collapses and weakens the cylinder of filled casing so that a twist is formed by the continuing rotation of the unpinched portion of the casing. Pinching is usually accomplished in present devices by means of V-shaped pinching members which engage the opposite sides of the casing and pinch it so as to cause a link to be formed therein. The pinching members are mounted on chains trained around two sets of sprockets, and include V-notches spaced radially outwardly beyond the path followed by the longitudinal centerlines of the belts as they pass around the drive sprockets. Consequently, a whipping action is developed when the V-notches are carried around each of the sprockets. This whipping action causes the pinching members to tear into the casing as they approach and engage the casing. While present linking devices generally do not cause tearing in cellulose casings, they very often cause natural or dissolvable casings to be torn or be jerked free from the action of the rotating chuck.

Presently known encasing devices also utilize a looping device at a point beyond the linking apparatus. These looping devices include means for swinging the linked casings in an arc and for catching the swinging casings on hooks traveling on a conveyor. Presently known devices swing the loops in such a great arc that when they are suspended from the hooks their weight causes natural casings and artificial dissolvable casings to tear.

The present invention includes improvements over devices heretofore known in that it provides means for treating the casing gently as it is being filled and linked and looped. The stuffing tube is adapted to rotate with a folded casing mounted thereon, and consequently the casing is rotated both before and immediately after it is filled. Furthermore, the chuck is adapted to rotate in unison with the stuffing tube so that there are no torsional forces applied to the folded casing. The linking apparatus of the present invention includes pincher members which move at a constant velocity and which are not whipped around the drive wheels of the chains as in previous devices. The chuck of the present invention is a split chuck adapted to spread away from the stuffing tube so as to permit easier mounting of the casing over the stuffing tube. The looper of the present invention makes loops which are smaller, thereby reducing the weight of each loop and preventing tearing when the loops are suspended from hooks.

Therefore, a principal object of the present invention is the provision of a product encasing apparatus which is capable of filling a delicate casing material without tearing it;

A further object of the present invention is the provision of an apparatus which will encase a product within natural casings and dissolvable casings presently being used;

A further object of the present invention is the provision of an apparatus which will eliminate substantially the torsional forces which are applied to the casing during the filling operation;

A further object of the present invention is the provision of an apparatus which will rotate the casing during the time it is being filled and will also rotate the material being pumped into the casing;

A further object of the present invention is the provision of an apparatus including means for preventing the material being pumped into the casing from ballooning the casing beyond a predetermined point;

A further object of the present invention is the provision of an apparatus including yieldably movable lands for preventing excessive ballooning of the casing after it has been filled;

A further object of the present invention is the provision of an apparatus including a chuck which is easily movable away from the stuffing tube to permit mounting of a folded casing thereon;

A further object of the present invention is the provision of an apparatus including linking means for linking and twisting delicate casings filled with product without tearing the casing;

A further object of the present invention is the provision of an apparatus including linking means having pinching members which engage and pinch the casing gently without tearing it;

A further object of the present invention is the provision of an apparatus including linking means having pinching surfaces which travel in an endless path at a substantially constant velocity;

A further object of the present invention is the provision of an apparatus having looping means which loop the link filled casings and convey them without tearing them even if delicate, natural or artificial casings are used; and A further object of the present invention is the provision of an apparatus including looping means which will loop the linked casing in loops small enough so that their weight will not tear the casing.

This invention consists in the construction, arrangements, and combination of the various parts of the device, whereby the objects contemplated are attained as hereinafter more fully set forth, specifically pointed out in the claims, and illustrated in the accompanying drawings in which:

Referring to the drawings, the numeral 10 generally designates an apparatus for encasing a product so as to produce sausages, franks and the like. Apparatus 10 includes a casing filling machine 12, a linking apparatus 14, a looping apparatus 16, and a support cabinet 18 having a drive system 20 (FIG. 10) enclosed therein.

Support cabinet 18 includes a plurality of support legs 22, four cabinet side walls 24, a cabinet top 26. Casing filling machine 12 is mounted on and supported by cabinet top 26, and includes a product pump 28 which is adapted to pump products of plastic consistency. Product pumps of this type are known in the art and therefore further description of pump 28 is unnecessary other than to state that it includes an inlet 30 adapted to be connected to a conduit leading from a supply of plastic product, and further includes an outlet 32 through which the product is pumped. Operatively secured over outlet 32 is a connecting conduit 34 which is adapted to receive the plastic product being pumped through outlet 32.

A spindle housing 36 includes a chamber 38 therein and further includes an inlet coupling 39 adapted for retentively receiving connecting conduit 34 therein. Rotatably mounted within housing 36 is a spindle 40 which includes a spindle tube 42, a fixed ring 44, a slidable ring 46, and a pair of spindle arms 48. Spindle tube 42 is rotatably journaled in housing 36 by means of front and rear bearings 50, and includes a belt receiving track 52 on its outer surface. Track 52 includes a plurality of small teeth 54 adapted to engage teeth on the interior surface of a drive belt 56 which is trained around track 52. Adjacent its forward end spindle tube 40 includes a head 58 including a pair of wing flanges 60 (FIG. 5) oppositely positioned thereon. Extending through spindle tube 42 is an elongated bore 62 having a minor bore 64 adjacent its rearward end. Minor bore 64 is of slightly less diameter than bore 62, and a forwardly presented annular shoulder 66 is formed therebetween. Adjacent the forward end of bore 62 is a threaded portion 68.

Rigidly mounted within spindle tube 42 is a stuffing tube 70 having an intake opening 72 at its rear end and a discharge opening 74 at its forward end. The rearward end of stuffing tube 70 is press fitted or otherwise rigidly mounted within a cylindrical mounting slug 76. Mounting slug 76 includes a cylindrical outer surface 78 which is adapted to slidably fit within minor bore 64 of spindle tube 42 and protrude axially outwardly therefrom into connecting conduit 34. A sealing ring 80 on the interior of conduit 34 provides sealing between the interior of conduit 34 and the exterior surface 78 of the mounting slug 76 so that mounting slug 76 can rotate within conduit 34 and simultaneously be sealed therein. Mounting slug 76 includes an annular rim flange 82 which is adapted to abut against shoulders 66 so as to limit the rearward movement of mounting slug 76 within spindle tube 42. Slug 76 includes a tube receiving bore 84 extending therethrough for receiving stuffing tube 70 with a press fit so that stuffing tube 70 and mounting slug 76 are rigidly secured to one another. Adjacent the rearward end of tube receiving bore 84 is a funnel opening 86 which is in communication with the interior of connecting conduit 34 so as to permit passage of plastic product from outlet 32 of pump 28, through connecting conduit 34, and into the interior of stuffing tube 70.

Mounting slug 76 is rigidly secured within spindle tube 42 by means of a locking cylinder 88. Locking cylinder 88 includes a threaded head 90 adapted to be threadably retained within threaded portion 68 of elongated bore 62. Locking cylinder 88 extends rearwardly within spindle tube 42 and at its rearward end engages annular rim flange 82 of mounting slug 76 thereby pressing it against forwardly presented shoulder 66 of spindle tube 42. Thus mounting slug 76 and stuffing tube 70 are rigidly mounted within spindle tube 42 so that rotation of spindle tube 42 causes mounting slug 76 and stuffing tube 70 to rotate in unison therewith.

Fixed ring 44 is rigidly mounted to spindle tube 42 by means of two elongated bolts 92 (FIGS. 2 and 5) which extend through wing flanges 60 of spindle tube 42 and which also extend through and are rigidly secured to fixed ring 44. Slidable ring 46 is slidably mounted on bolts 92 between fixed ring 44 and wing flanges 60 by means of sliding collars 94 which are slidable on bolts 92. Thus both fixed ring 44 and slidable ring 46 are adapted to rotate in unison with spindle tube 42, but only slidable ring 46 is axially movable with respect to stuffing tube 70. Extending around the outer peripheral edge of slidable ring 46 is a peripheral flange 96.

A spindle handle 97 is pivotally secured to housing 36 and includes a pair of yoke arms 98. A pair of sliding shafts 100 are slidably received on opposite sides of housing 38 and are adapted to slide longitudinally with respect to the axis of stuffing tube 70. At their forward ends sliding shafts 100 include inwardly presented grooves 102 which slidably embrace annular peripheral flange 96 so as to permit slidable ring 46 to rotate but at the same time to hold slidable ring 46 against axial movement with respect to stuffing tube 70. Shafts 100 also each include a slot 104 extending vertically therethrough and receiving yoke arms 98 of spindle handle 97. By swinging spindle handle 97 with respect to its pivotal connection to housing 36 the operator can cause sliding shafts 100 to move longitudinally with respect to tube 70 thereby causing sliding ring 46 to also move longitudinally therewith.

Figures 4, 5:
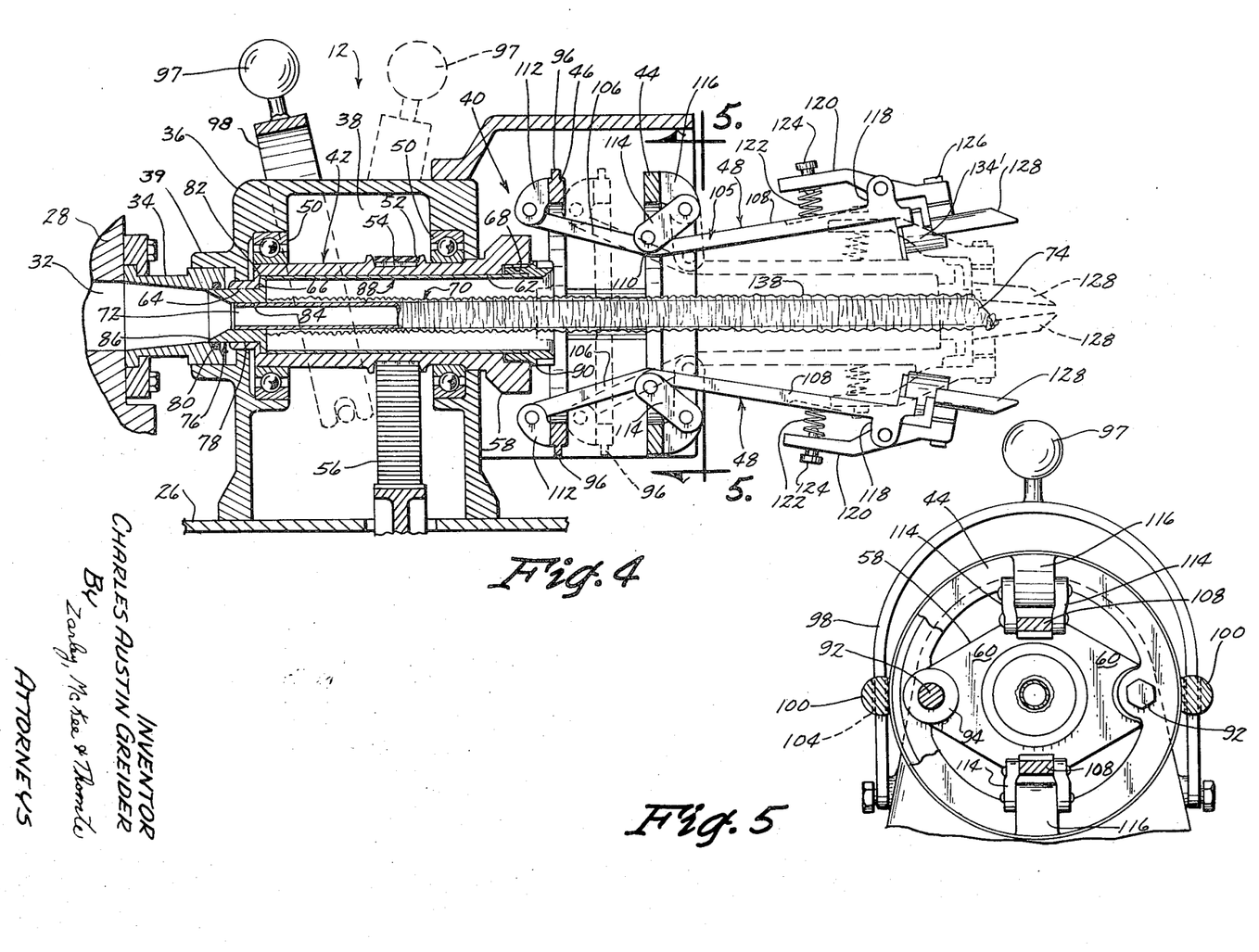
FIG. 4 is a sectional view taken along line 4—4 of FIG. 2.
FIG. 5 is a sectional view taken along line 5—5 of FIG. 4.
Figures 6, 7, 8, 9:
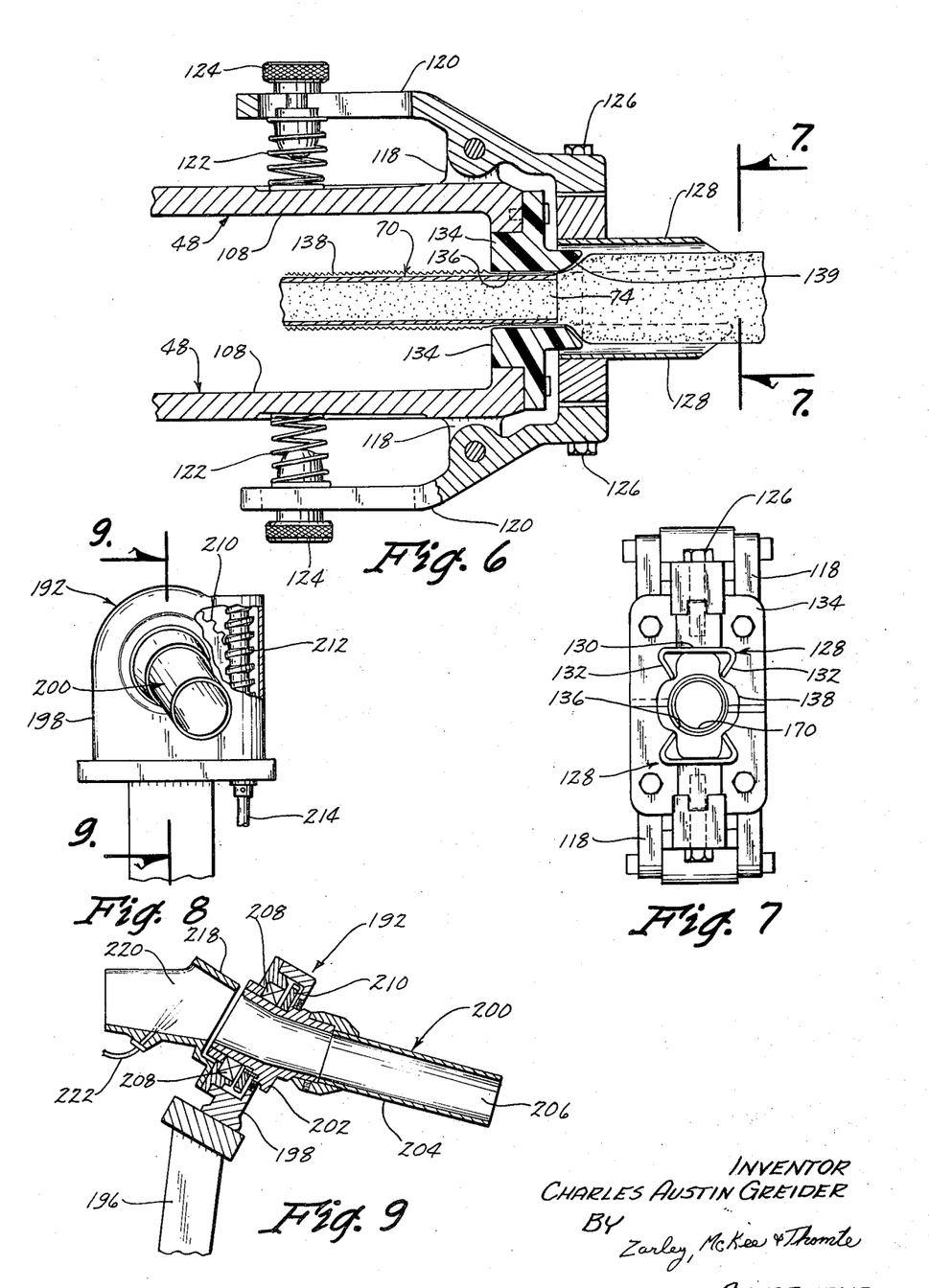
FIG. 6 is an enlarged detailed sectional view taken adjacent the discharge end of the stuffing tube.
FIG. 7 is a sectional view taken along line 7—7 of FIG. 6.
FIG. 8 is a detail perspective view of the looping apparatus showing portions thereof broken away.
FIG. 9 is a sectional view taken along line 9—9 of FIG. 8.

Referring to FIG. 4 spindle arms 48 each include an angled arm member 105 which includes two oblique portions 106 and 108 joined at an apex 110. The rearward ends of arms 48 are each hinged to slidable ring 46 by means of a bracket 112. Arms 48 are also each connected to fixed ring 44 by means of a link 114 which is pivoted at one of its ends to a bracket 116 on fixed ring 44 and at the other of its ends to arms 48 at apex 110. At the extreme forward end of each of arms 48 is a pivot ear 118. A pair of spring fingers 120 (FIG. 6) are each pivotally secured to pivot ears 118 intermediate their lengths. The rearmost end of each spring finger 120 is biased radially outwardly by means of a spring 122. Also threadably extending through an aperture in the rearmost end of each spring finger 120 is a stop 124 which is adapted to be threadably adjusted for limiting the movement of the rearmost end of the spring finger 120 against the bias of spring 122. Mounted by means of bolts 126 to the extreme forward ends of the spring fingers 120 are a pair of lands 128. Lands 128 are elongated and have a cross-sectional shape which is somewhat like a "C". In cross-section they include a central wall 130 which is joined on opposite sides by inwardly slanting walls 132 (FIG. 7).

A pair of chuck blocks 134 are each bolted to the extreme forward ends of spindle arms 48. When portions 108 of spindle arms 48 are parallel, chuck blocks 34 form a circular chuck aperture 136 which surrounds stuffing tube 70 in spaced relation thereto so as to provide room for casing 138 to pass therethrough when it is unfolded and is surrounding stuffing tube 70. The extreme forward end of chuck aperture 136 is tapered outwardly in a funnel configuration as illustrated at 139. Chuck blocks 134 are positioned immediately rearwardly of lands 128 so that lands 128 will embrace the filled casing 138 and impart a somewhat rounded cross shape (FIG. 7) to it as it emerges from chuck aperture 136. By virtue of the pivotal mounting of spring arms 120 and the spring mounting thereof, lands 128 are yieldably movable outwardly against the bias of the springs 122 until stopped by adjustable stops 124.

Before the operation of casing filling machine 12 is begun, handle 97 is swung rearwardly to its rearmost position (FIG. 4) thereby causing slidable ring 46 to be moved rearwardly. Rearward movement of slidable ring 46 causes spindle arms 48 to swing rearwardly on links 114 and this motion causes arms 48 to move rearwardly and simultaneously to move radially outwardly with respect to stuffing tube 70. The outward movement of spindle arms 48 is most exaggerated at their extreme forward ends wherein are mounted chuck blocks 134 and spring fingers 120. Thus rearward movement of handle 97 causes chuck blocks 134 and spring fingers 120 to be moved rearwardly and radially outwardly with respect to tube 70. Once tube 70 is free from obstruction an accordion-like folded casing 38 is slidably mounted over stuffing tube 70 and is moved rearwardly thereon. The extreme forward end of the folded casing is unfolded and is pulled forwardly beyond the discharge end 74 of tube 70 prior to the movement of handle 97 to its forward position. Handle 97 is then swung forwardly so as to cause the extreme forward ends of spring arms 48 to be moved forwardly and radially inwardly with respect to stuffing tube 70. Links 114 are slightly over center and slanted forwardly when handle 97 is in its forward position, thereby creating a toggle-like lock of handle 97 in its extreme forward position. When handle 97 is in its extreme forward position chuck blocks 134 and spring fingers 128 are in the position shown in FIG. 6. Thus when handle 97 is in its forward position the unfolded forward end of casing 138 is threaded through chuck aperture 136 and extends between lands 128.

Operation of casing filling machine 12 is begun by actuating drive belt 56 by drive means (using drive apparatus described more fully herein after) thereby causing the entire spindle 40 to rotate. That is, upon actuation of drive belt 56, stuffing tube 70, spindle tube 42, fixed and slidable rings 44, 46, spindle arms 48, chuck blocks 134, and lands 128 all rotate in unison. Pump 28 is then actuated to cause a plastic product material to be forced through connecting conduit 34 into intake opening 72, through stuffing tube 70 and outwardly through discharge opening 74. Since stuffing tube 70 is rotating the stuffing material also begins to rotate as it enters intake opening 72 and by the time it reaches discharge opening 74 it is rotating in unison with stuffing tube 70. As the product material issues forth from discharge opening 74 it enters the portion of casing 138 which is immediately in front of discharge opening 74 (FIG. 6). Because of its mounting on stuffing tube 70 casing 138 is rotating in unison therewith. As the forward end of casing 138 is filled with product issuing from discharge opening 74, it pulls and unfolds the accordion-like folds of casing 138, drawing the unfolded casing through chuck aperture 136. Practically no torsional forces are applied to casing 138 because casing 138, chucks 134, stuffing tube 70 and the product material within stuffing tube 70 are all rotating in unison. Thus when casing 138 is filled with the plastic product material it is rotating in unison with spindle 40. Lands 128 on spring fingers 120 embrace the filled casing immediately after it issues from discharge opening 74. The pressure of the plastic material causes a slight ballooning effect in casing 138 immediately after it is filled. Lands 128 embrace casing 138 so as to limit this ballooning effect. Stops 124 can be adjusted to limit the ballooning effect to the desired amount.

Figure 10:
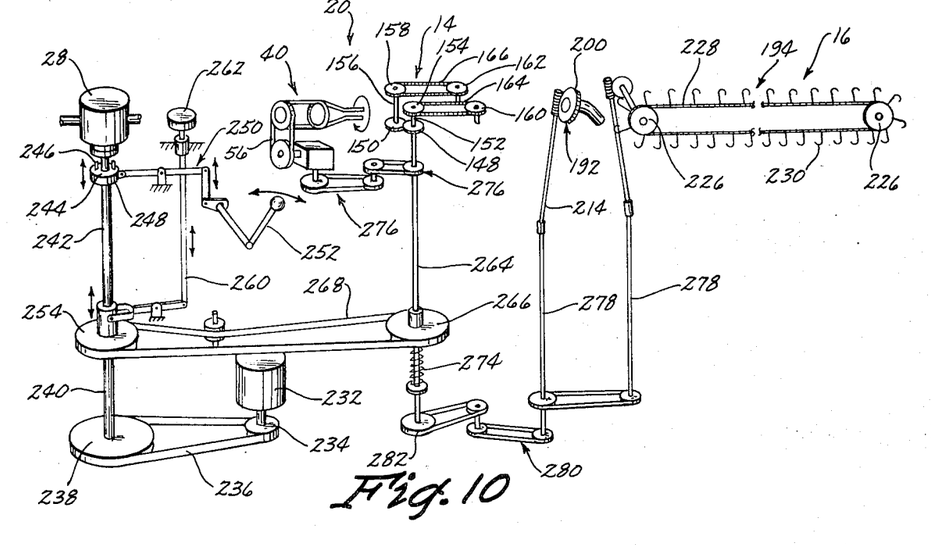
FIG. 10 is a schematic view illustrating the drive apparatus for the present invention.

Also mounted on cabinet top 26 is linking apparatus 14, which is positioned forwardly of lands 128. Linking apparatus 14 includes a flat frame 140 (FIG. 3) which is supported above cabinet top 26 by means of a plurality of legs 142. Operatively secured above flat frame 140 is a gear plate 144 which cooperates with flat frame 140 to form a gear box 146 adapted to hose a pair of intermeshing link drive gears 148, 150 (FIG. 10). Extending upwardly from gear 148 is a short shaft 152 which supports a sprocket or drive wheel 154 at its upper end. Extending upwardly from gear 150 is a long shaft 156 which supports a sprocket or drive wheel 158 at its upper end. Rotatably mounted on flat frame 40 in the same plane as sprocket 154 is a freewheeling sprocket 160, and also rotatably mounted on flat frame 140 is another free-wheeling sprocket 162 which is in the same plane as drive sprocket 158. Trained around sprockets 154, 160 is a first loop chain 164, and trained around sprockets 158, 162 is a second loop chain 166. While chains 164, 166 are disclosed as being loop chains, loop members other than chains may also be used without detracting from the invention. Chains 164, 166 are positioned in horizontal planes spaced from one another and furthermore are positioned so that they each have common portions 168, 170, respectively, which pass in vertical alignment with one another. The elongated vicinity where portions 168, 170 travel in vertical alignment will be generally referred to hereinafter as a linking station. Rigidly secured to flat frame 140 are a pair of backing plate members 172, 174, which run along the opposite sides of the linking station and support portions 168, 170 of loop chains 164, 166.

Figures 3, 12:
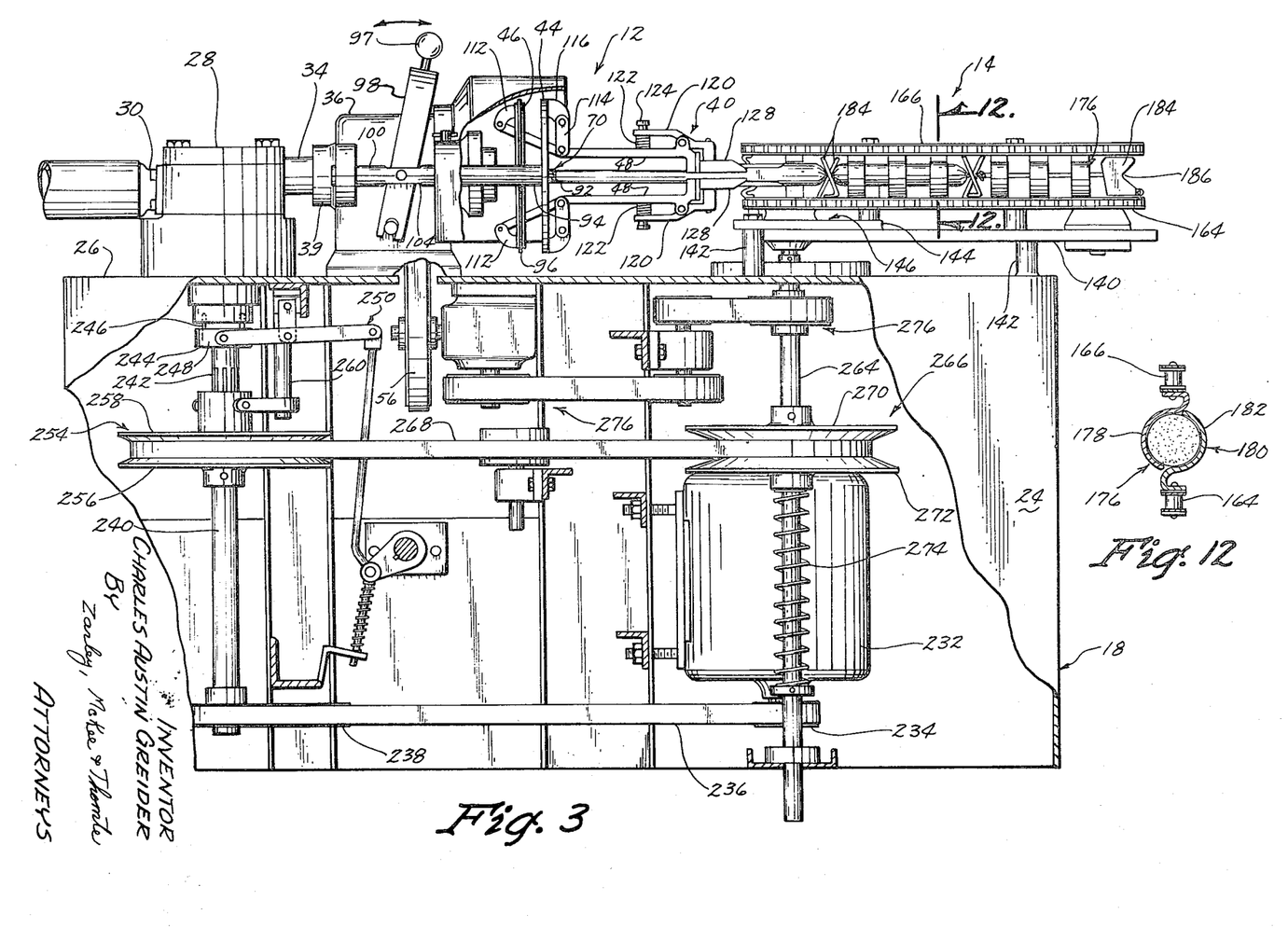
FIG. 3 is a side-elevational view of the present invention showing portions of the support cabinet broken away.
FIG. 12 is a sectional view taken along line 12—12 of FIG. 3.

Referring to FIG. 12, a plurality of upper guide members 176 are mounted on the lower surface of chain 166 and extend downwardly therefrom to form an arcuate semicircular hook portion 178. Rigidly mounted on the upper surface of chain 164 are a plurality of upwardly extending lower guide member 180 which have a hook-like portion 182 at their upper ends. When guide members 176, 180 are carried adjacent the aforementioned linking station they form a configuration such as shown in FIG. 12 wherein hook portions 178, 182 cooperate to form a substantially circular opening through which casing 138 may loosely extend as it passes through the linking station Also rigidly mounted on loop chains 164, 166 are a plurality of pinching members 184 (FIG. 11), each of which as a V-shaped notch 186 in one of its lateral edges. Each V-shaped notch 186 includes an apex 88 which is in approximate vertical alignment with a longitudinal centerline 190 of chains 164, 166. While the exact apex of each notch 186 need not be in exact vertical alignment with centerlines 190, at least a portion of V-shaped notch 186 should be in such vertical alignment. Such alligned portions, however, should preferably be adjacent apex 188. Because of their vertical alignment with centerline 190, apexes 188 or the portions adjacent thereto do not accelerate when passing around the outer peripheral edges of sprockets 158, 162 or sprockets 156, 160. The pinching notches of previous devices are entirely outside the line formed by the centerline in each loop chain. As a result of this arrangement the pinching notches of the pinching members in previous devices accelerate as they move around the arcuate path surrounding each sprocket. Notches 186 are an improvement over previous devices in that at least a portion of each notch 186 is positioned in direct vertical alignment below the centerline of chain 164 or above the centerline of chain 166 depending upon which chain the pinching member 184 is mounted upon. Consequently, at least a portion of each pinching notch 186 traces a path identical to but spaced from the longitudinal centerline of the loop chain on which it is mounted. These aligned portions of notches 186 trace an arc around each sprocket which has a radius of curvature the same as the radius of curvature formed by the longitudinal centerline of the sprocket chain on which it is mounted, thereby causing a minimum of whipping action of the notch as it passes around the sprocket.

Each pinching member 184 on first loop chain 164 is adapted to cooperate with one of pinching members 184 on second loop chain 166 as it passes by the linking station so as to collapse filled casing issuing from stuffing tube 70. The rotational movement of the casing rearwardly of the point where it is collapsed causes a twist to be imparted adjacent the point where the casing has been collapsed. As can be seen in FIG. 3, pinching members 184 on first loop chain 164 are canted with respect to pinching members 184 mounted on second loop chain 166 so that from the side they form an "X" shape when pinching the casing.

Looping apparatus 16 is positioned immediately forwardly of linking apparatus 14 so as to receive the linked casings issuing from linking apparatus 14. Looping apparatus 16 includes a swinging device 192 and a loop conveying device 194. Swinging device 192 includes a support leg 196 which is operatively mounted to support cabinet 18. At the extreme upper end of support leg 196 is mounted a gear housing 198 (FIGS. 8 and 9). Rotatably mounted within gear housing 198 is a swing horn 200 having a horn base 202 and a horn extension 204. Extending through horn 200 is a horn bore 206 which is considerably larger than the diameter of the filling casing. Horn base 202 is rotatably mounted in gear housing 198 by means of bearings 208 and includes an annular gear 210 within housing 198. A worm gear 212 engages the teeth of annular gear 210 and is operatively connected to a worm gear shaft 214. Shaft 214 is driven by drive system 20 as will be more fully described hereinafter. Thus worm gear 212 is adapted to rotate swing horn 200. Horn extension 204 has a substantially straight longitudinal axis which is at an angle with respect to the rotational axis of horn base as bearing means 202. Consequently, rotation of horn base 202 causes horn extension 204 to swing in an arc shown by arrows 216 in FIG. 1. Also rigidly secured to gear housing 198 is a adapted funnel 218 which includes a funnel opening 220 extending longitudinally therethrough in registered alignment with the rearward end of horn bore 206. A water tube 222 is connected to horn funnel 218 and is adapted to spew a stream of water within funnel opening 220 so as to provide a lubrication therein to facilitate the movement of the linked casings therethrough.

Loop conveying device adapted includes a conveyor frame 224 which supports a pair of spaced conveyor sprockets 226 at its upper end. Trained around conveyor sprockets 226 is a conveyor chain 228 having a plurality of J-shaped hooks 230 mounted thereon in spaced relation to one another. Conveyor chain 228 is addapted to be moved around sprockets 226 and is positioned so that hooks 230 pass adjacent the extreme forward end of horn extension 204.

Figures 1, 2, 11:
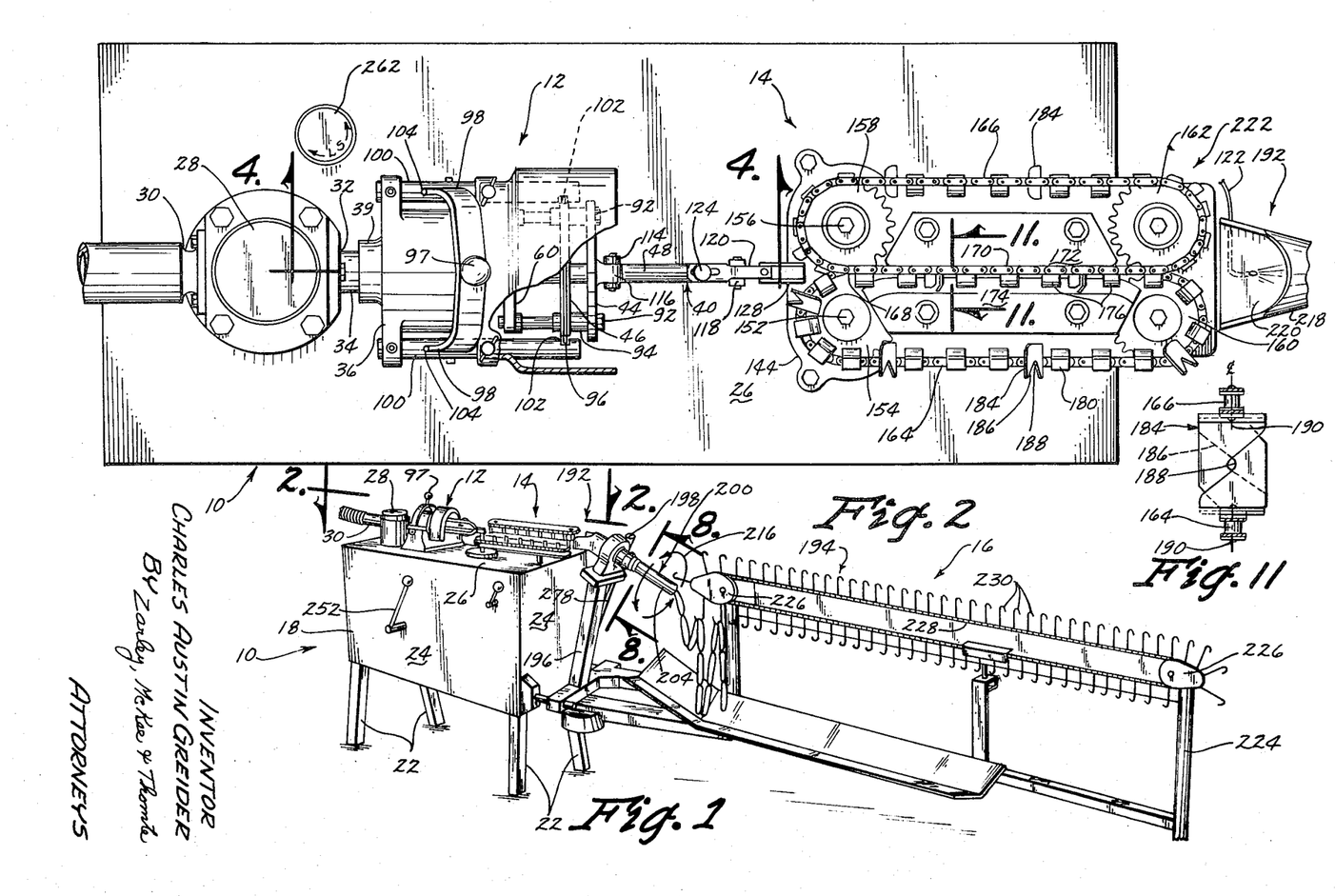
FIG. 1 is a perspective view of the apparatus for encasing a product.
FIG. 2 is a top view taken along line 2—2 of FIG. 1.
FIG. 11 is a sectional view taken along line 11—11 of FIG. 2.

In operation of looping apparatus 16, the linked casings are guided from linking apparatus 14 into funnel opening 220 of swing horn 200. As the linked casing passes through horn extension 204 it is swung in an arc defined by arrows 216. The movement of horn extension 204 is synchronized with the movement of hooks 230 on conveyor chain 228 so that one hook passes by the extreme forward end of horn extension 204 with each revolution made by horn extension 204. Consequently the linked casings are looped over each hook by the circular movement of horn extension 204 as can be seen in FIG. 1. After the linked casings have been looped over hooks 230 they are conveyed away from the vicinity of swing horn 200 by the movement of conveyor chain 228. The length of horn extension 204 is such that the loops which it makes are small enough to prevent the weight of each loop from causing tearing of the casing.

Referring to FIGS. 3 and 10, drive system 20 includes a motor 232 having a pulley 234 operatively connected to its output shaft. A first drive belt 236 is trained around pulley 234 and a similar but larger pulley 238 mounted on the lower end of a pump drive shaft 240. The extreme upper end of drive shaft 240 includes a plurality of splines 242 thereon. Slidably mounted over the extreme upper end of shaft 240 is a pump clutch bearing 244 having a pair of upwardly presented teeth 246 thereon. Clutch bearing 244 is adapted to slide longitudinally on shaft 240, but engages splines 242 so that it is held against rotational movement with respect to shaft 240. Clutch bearing 244 is housed within a retaining collar 248 which permits rotational movement of clutch bearing 244 therein but which also holds clutch bearing 244 against axial movement on shaft 240. Retaining collar 248 is pivotally connected to a plurality of links 250 which in turn are connected to a pump clutch handle 252. Handle 252 is mounted on the outside of support cabinet 18 and is adapted to be manually manipulated to move clutch bearing 244 between a disengaged position wherein teeth 246 are spaced from pump 28 (FIG. 10) to an engaged position wherein teeth 246 engage and drive pump 28 (FIG. 3).

Mounted on shaft 240 intermediate its ends is a variable width pulley 254 which includes a stationary member 256 and a movable member 258. Movable member 258 is operatively connected to a speed control link 260 which in turn is connected to a speed control knob 262 extending outwardly from cabinet top 26. Rotation of speed control knob 262 causes movement of movable member 254 toward and away from stationary member 256 so as to vary the width of variable width pulley 254. A machine drive shaft 264 is rotatably journaled within cabinet 18 and includes a variable width pulley 266 which is in alignment with variable width pulley 254 and is adapted to receive a machine drive belt 268 which is trained around pulleys 254, 266. Variable width pulley 266 includes a stationary member 270 and a movable member 272 which is biased toward stationary member 270 by means of a spring 274. The speed with which shaft 264 is driven by belt 268 is controlled by speed control knob 262. As movable member 258 is moved towards stationary member 256 of variable pulley 254, the tension in belt 268 is increased thereby forcing movable member 272 of variable width pulley 266 away from stationary member 270 against the bias of spring 274. Consequently the effect of such an action and reaction are that the diameter of variable pulley 254 is increased and the diameter of variable pulley 266 is decreased in response to movement of movable member 258 toward the stationary member 256. This, of course, causes shaft 264 to be driven at a greater speed.

Machine drive shaft 264 is adapted to supply the driving force for spindle 40, link drive gears 148, 150, swing horn 200, and conveyor chain 228. Spindle 40 is driven by a plurality of belts and pulleys 276 which tap power off a spindle drive pulley 276 connected to machine drive shaft 264 intermediate its length. The extreme upper end of machine drive shaft 264 protrudes through cabinet top 26 and includes a key (not shown) therein which is adapted to engage link drive gear 148 so as to rotate it and drive linking apparatus 14. Swing horn 200 and conveyor chain 228 are driven by a pair of universally jointed shafts 278 which in turn are connected by means of a series of pulleys and belts 280 to a looping drive pulley 282 on shaft 264.

In operation drive system 20 receives its singular source of power from motor 232. Actuation of motor 232 causes rotation of pump drive shaft 240 and consequently the actuation of spindle 40, linkage apparatus 14, and looping apparatus 16. The velocity at which spindle 40, linkage apparatus 14, and looping apparatus 16 are driven can be varied by rotation of speed control knob 262. The introduction of plastic product into stuffing tube 70 is initiated by moving handle 252 so as to cause pump clutch bearing 246 to drivingly engage pump 28.

Thus it can be seen that a unique apparatus for encasing a product has been provided which results in very little stress and strain on the casing so that a delicate and easily tearable casing material can be used. Consequently, the apparatus of this invention is able to encase product within natural animal intestine casings or within delicate dissolvable casings presently being used. Because the casing is rotated both before and after it is filled there are substantially minimal torsional forces applied to the casing during the filling operation. The fact that the material being pumped into the casing is also rotating contributes additionally to the reduction of torsional forces applied to the casing. The provision of spreadable chucks and lands facilitates the mounting of the casing on the stuffing tube even though the casing, stuffing tube, and lands rotate in unison during the stuffing operation. The pinching members on the linking apparatus do not accelerate substantially as they pass around the drive wheels which carry the chains. This reduces the whipping action to a minimum when the pinching surfaces engage the casing and grip it to provide links.

Looping horns such as the one disclosed in U.S. Pat. No. 3,191,222 have been previously used for looping linked casings, but these previous horns have not been adapted to handle delicate casings satisfactorily. The horn extension shown in U.S. Pat. No. 3,191,222 is helical or spiral in shape whereas the horn extension of the present invention is substantially straight and disposed at an angle with respect to the rotational axis of the bearing means (horn base 202) which supports the horn extension. The result of this modification is that the casings are gently swung back and forth for looping over the hooks of the conveyor. The action is gentler and less likely to cause tearing of the casing than the action obtained from the previous helical horn.

Thus it can be seen that the device accomplishes at least all of its stated objectives.

I claim

1. Apparatus for encasing a product comprising, a support;

an elongated stuffing tube having a product
a rearward end and a discharge forward end, said tube being rotatably mounted on said support for rotation about its longitudinal axis, said forward end of said stuffing tube being adapted for protruding within and supporting a folded casing whereby rotation of said stuffing tube causes rotation of said folded casing;

means for introducing said product into said rearward end of said tube and for forcing said product out of said tube through said forward end into said casing; and drive means for rotating said stuffing tube thereby imparting a rotation to said casing both before and after it is filled;

a spindle fixed to said stuffing tube at a point spaced axially rearwardly from said forward end; said spindle carrying a chuck and at least two lands; said chuck having an aperture therein which surrounds said tube adjacent its forward end in spaced relationship to its outer surface, said lands being positioned axially forwardly of said forward end and being adapted to embrace and guide said casing after it is filled with said product, said spindle including a first section which is fixed to said stuffing tube and is held against movement with respect thereto; said spindle also including at least two arms movably mounted to said first section and adapted to move toward and away from the longitudinal axis of said stuffing tube; each of said lands being mounted on one of said arms so that movement of said arms toward and away from said longitudinal axis causes similar movement of said lands.

2. Apparatus according to claim 1 wherein said first section of said spindle includes a fixed ring which surrounds said tube in spaced relation thereto; said arms extending through said fixed ring in the space between said ring and said tube; said arms each being swingably connected to said fixed ring by means of a link which is pivoted at its opposite ends to said ring and said arm; mechanism drivingly connected to said arms and adapted to be manually manipulated to move said arms axially with respect to said tube, whereupon axial movement of said arms causes them to swing on said links, thereby altering the distance of said arms from said tube.

3. Apparatus according to claim 2 wherein said spindle includes a slidable ring which surrounds said tube in spaced relation thereto, each of said arms being hinged to said slidable ring at a point spaced from the pivotal connection between said arm and said link, said slidable ring being free to move axially with respect to said tube; and said mechanism including a handle swingably mounted to said support, said handle slidably engaging said slidable ring so as to permit rotation of said slidable ring with respect to said handle; said handle being adapted to swing in a direction which causes it to urge said slidable ring axially with respect to said tube.

4. Apparatus according to claim 1 including linking apparatus mounted on said support adjacent said forward end of said stuffing tube, said linking apparatus including gripping means for gripping a portion of said casing after it is filled and for holding said gripped portion against rotation whereupon rotation of said stuffing tube causes twisting of said casing at said gripped portion.

5. Looping and conveying apparatus for use with means adapted to issue forth an elongated linked casing, said apparatus comprising:

a support;

an elongated tube-like horn extension having first and second end portions and a bore extending therethrough and therebetween for slidably receiving said casing, said second end portion having a length substantially greater than the length of said first end portion, bearing means on said support having an axis of rotation and rotatably supporting said first end portion of said horn extension, said second end portion having a longitudinal axis which is substantially straight and which is angularly disposed with respect to the longitudinal axis of said first end portion and angularly disposed with respect to said axes of rotation of said bearing means, drive means for rotating said horn extension on said bearing means; and a conveyor including a plurality of spaced apart hooks thereon and also including carrying means for moving said hooks along a predetermined path, said conveyor being positioned so that said hooks will pass adjacent said second end of said horn extension when being moved by said carrying means, whereupon said hooks will catch and carry away said casing at spaced points along the length of said casing as said casing passes out of said second end of said horn extension.

6. Linking apparatus according to claim 5 wherein the apexes of said V-shaped notches are in substantial vertical alignment with the longitudinal centerline of the loop member associated therewith to achieve said constant velocity.

7. Linking apparatus according to claim 6 wherein said portions of said pinching surfaces are held by said loop members so that they trace a path identical to and spaced from the longitudinal centerlines of the one of said loop members on which they are mounted.

8. Linking apparatus according to claim 6 wherein each of said portions of said pinching surfaces traces a curve as it passes around each of said drive wheels, said curve having the same radius of curvature as the curve defined by the longitudinal centerline of said loop member at the point where it carries said pinching surface.

9. Linking apparatus according to claim 6 wherein said first and second loop members carry a plurality of guide members and move them past said linking station, said guide members being adapted to loosely embrace said casing and guide it as they pass said linking station.

10. Linking apparatus according to claim 6 wherein said pinching members on said first loop member are canted with respect to said pinching members on said second loop member when passing said linking station.

11. Linking apparatus for use with a product encasing machine, said machine being adapted to expel an elongated casing filled with plastic product and being adapted to rotate said casing about its longitudinal axis; said linking apparatus comprising, a support;

first and second sets of drive wheels rotatably mounted on said support;

means for rotating said drive wheels;

first and second loop members trained around said first and second sets of drive wheels respectively, said first and second loop members defining two separate horizontal planes, said first loop members having a first loop portion which overlaps a second loop portion of said second loop member to define a linking station, said first and second loop portions being vertically spaced and horizontally disposed with respect to each other so as to pass on opposite sides of said casing, means for moving said wheels, a plurality of pinching members having pinching surfaces thereon carried around said first and second sets of drive wheels by said first and second loop members respectively, each of said pinching surfaces on said first loop member being positioned for cooperating with one of said pinching surface on said second loop member while passing said linking station so as to collapse said casing therebetween and reduce its cross-sectional size;

each of said loop members carrying said pinching members in a position wherein a portion of each of said pinching surface travels at a constant velocity around said sets of drive wheels, said pinching surfaces being formed by the edges of V-shaped notches formed in said pinching members, said portions of said pinching surfaces having constant velocity being located adjacent the apexes of said V-shaped notches.

12. Apparatus for encasing a product comprising, a support;

an elongated stuffing tube having a product receiving rearward end and a discharge forward end, said tube being rotatably mounted on said support for rotation about its longitudinal axis, said forward end of said stuffing tube being adapted for protruding within and supporting a folded casing whereby rotation of said stuffing tube causes rotation of said folded casing;

means for introducing said product into said rearward end of said tube and for forcing said product out of said tube through said forward end into said casing; and drive means for rotating said stuffing tube thereby imparting a rotation to said casing both before and after it is filled, at least two fingers being mounted on said tube for rotational movement therewith; said fingers each having a land thereon positioned in front of said discharge opening; said lands being adapted to embrace said casing when it is filled by said product, said lands being movable radially outwardly with respect to the longitudinal axis of said tube; said lands being yieldably urged radially inwardly by spring means, each of said lands having in cross-section a middle portion and two side portions on opposite ends of said middle portion, said side portions extending inwardly towards each other in a converging manner, the terminal ends of said side portions of each of said lands being spaced with respect to each other.

13. Apparatus for encasing a product comprising, a support;

an elongated stuffing tube having a product receiving rearward end and a discharge forward end, said tube being rotatably mounted on said support for rotation about its longitudinal axis, said forward end of said stuffing tube being adapted for protruding within and supporting a folded casing whereby rotation of said stuffing tube causes rotation of said folded casing;

means for introducing said product into said rearward end of said tube and for forcing said product out of said tube through said forward end into said casing; and drive means for rotating said stuffing tube thereby imparting a rotation to said casing both before and after it is filled;

a chuck operatively mounted on said support for rotational movement in unison with said stuffing tube;

said chuck having an aperture extending therethrough; said discharge end of said tube protruding within and being spaced radially inwardly from the margins of said aperture so as to provide space for a portion of said casing to surround said tube and protrude through said aperture;

a land means operatively secured to said chuck for rotation therewith and being closely positioned forwardly of said chuck, said land means being adapted to embrace said casing when it is filled by said product and has been discharged from said chuck.

14. Apparatus according to claim 13 wherein said land means has a rearward end which partially receives the forward end of said chuck.

15. Apparatus according to claim 13 wherein a spindle is fixed to said stuffing tube at a point spaced axially rearwardly from said forward end, said chuck being mounted on said spindle and being formed from at least two chuck members which are movable from a closed position wherein they combine to form said aperture to an open position wherein they are spaced radially outwardly from their closed position, said land means being comprised of at least two lands, said first land operatively secured to one of said chuck members forwardly thereof for rotational movement therewith, said second land operatively secured to the other of said chuck members forwardly thereof for rotational movement therewith, said first and second lands also being movable from closed to open positions with said chuck members.

16. Apparatus according to claim 15 wherein lands are movable radially outwardly with respect to said chuck and said tube, said lands being yieldably urged radially inwardly by spring means.

17. Apparatus for encasing a product comprising, a support;

an elongated stuffing tube having a product receiving rearward end and a discharge forward end, said tube being rotatably mounted on said support for rotation about its longitudinal axis, said forward end of said stuffing tube being adapted for protruding within and supporting a folded casing whereby rotation of said stuffing tube causes rotation of said folded casing;

means for introducing said product into said rearward end of said tube and for forcing said product out of said tube through said forward end into said casing; and drive means for rotating said stuffing tube thereby imparting a rotation to said casing both before and after it is filled;

said means for introducing said product to said tube being a product pump; said drive means including a power means and first and second power transmission means, said first transmission means connecting said power means to said pump, said second transmission means connecting said power means to said stuffing tube; first and second adjustment mechanisms connected to said first and second transmission means respectively for providing independent adjustment of the speed at which said pump and stuffing tube are driven by said power means.

18. Apparatus according to claim 17 wherein a linking apparatus is provided adjacent said discharge end of said stuffing tube, said linking apparatus including loops carrying pinching members thereon; third transmission means connecting said loops to said power means for causing said loops to move said pinching members along an elongated linking station located adjacent said discharge end of said tube; said second adjustment mechanism being connected to said third transmission means for varying the speed of said stuffing tube and said loops simultaneously with respect to one another and independently of said product pump.

* * * * *

UNITED STATES PATENT AND TRADEMARK OFFICE
CERTIFICATE OF CORRECTION

PATENT NO. : 3,694,853
DATED : October 3, 1972
INVENTOR(S) : Charles A. Greider

It is certified that error appears in the above-identified patent and that said Letters Patent are hereby corrected as shown below:

Column 12, line 45, change "5" to --11--.

Signed and Sealed this

Eleventh Day of February 1986

[SEAL]

Attest:

DONALD J. QUIGG

Attesting Officer     Commissioner of Patents and Trademarks